Figure 1:
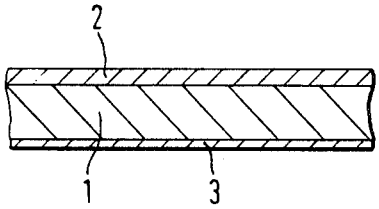
Figure 2:
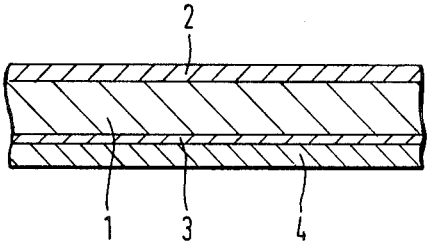
Figure 3:
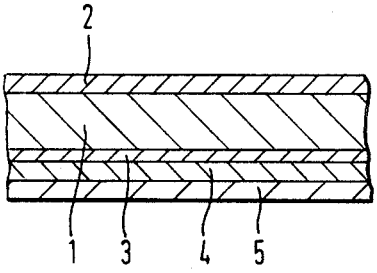
Figure 4:
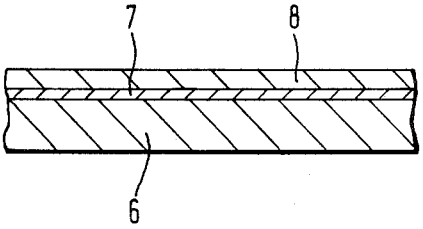
Figure 5:
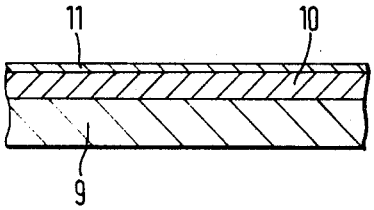

United States Defensive Publication [19] (H) [11] T977,001

Huffey et al. [43] Dec. 5, 1978

[54] LIGHT-SENSITIVE VESICULAR RECORDING MATERIALS

[75] Inventors: Roy F. Huffey, Ipswich; David E. Lothian, Colchester; Stuart C. Rennison, Hadleigh; Michael K. Titman, Colchester, all of England

[73] Assignee: Bexford Limited Imperial Chemical House, London, England

[21] Appl. No.: 843,060

[22] Filed: Oct. 17, 1977

[30] Foreign Application Priority Data

Jul. 7, 1977 [GB] United Kingdom ..... 28532/77

[51] Int. Cl.[2] ..... G03C 1/52; G03C 1/40; G03C 1/90; G03C 1/78

[52] U.S. Cl. ..... 96/75; 96/77; 96/83; 96/87 R

[57] ABSTRACT

Light-sensitive vesicular imaging materials, suitable for the production of labels, etc., comprise a light-sensitive vesicular imaging layer applied to one surface of a self-supporting plastics sheet or film preferably a polyester film, e.g., an oriented and heat-set film of polyethylene terephthalate, said light-sensitive vesicular imaging layer comprising a polymeric vehicle having uniformly dispersed therein a sensitizing agent which releases a vesicle-forming gas upon exposure to light and may comprise a nitrogent-liberating diazonium salt, said polymeric vehicle comprising a thermoplastic polymer having a nitrogent permeability constant (as defined in the specification) in the range $1 \times 10^{-15}$ to $1 \times 10^{-10}$ and being softenable upon heating above ambient temperature to permit the gas released by the sensitizing agent in the light-struck areas to form light-scattering or reflecting vesicles therein, e.g., a vinylidenechloride copolymer, and at least one light-reflecting metal layer such that an image formed in the light-sensitive vesicular imaging layer is viewed by means of light reflected by the metal layer, e.g., aluminum. The metal is preferably applied as a single layer on the opposite side of the sheet or film from the imaging layer. A dye may be included in the imaging layer and a self- or pressure-sensitive adhesive layer may be applied to the assembly.

16 Claims, 1 Sheet Drawing,

22 Pages Specification

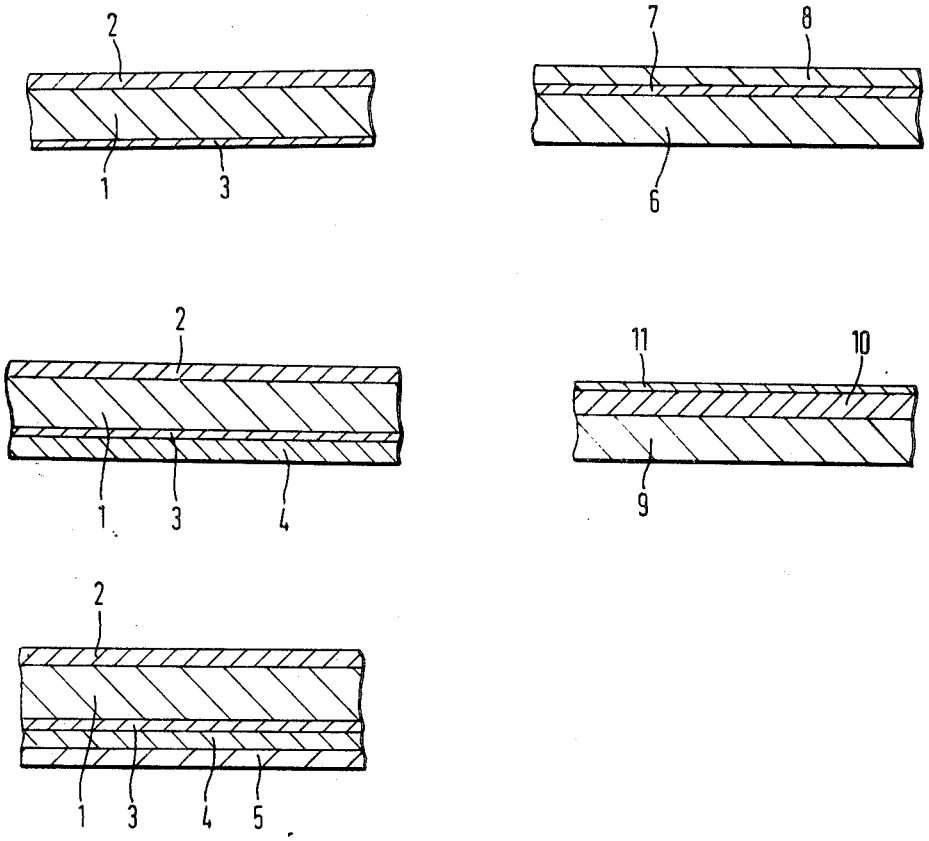

The file of this unexamined application may be inspected and copies thereof may be purchased (849 O.G. 1221, Apr. 9, 1968).